US007105068B2

(12) United States Patent
Briese et al.

(10) Patent No.: US 7,105,068 B2
(45) Date of Patent: Sep. 12, 2006

(54) METHOD AND APPARATUS FOR APPLYING ALIGNED TAPE PATTERNS

(75) Inventors: William Briese, Hinkley, OH (US); John Grismer, Cuyahoga Falls, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 0 days.

(21) Appl. No.: 10/922,741

(22) Filed: Aug. 20, 2004

(65) Prior Publication Data

US 2006/0037688 A1 Feb. 23, 2006

(51) Int. Cl.
*B32B 37/00* (2006.01)
*B32B 38/00* (2006.01)
*E06B 3/673* (2006.01)

(52) U.S. Cl. .......................... 156/64; 156/71; 156/256; 156/109

(58) Field of Classification Search .................. 156/64, 156/247, 248, 249, 256, 265, 269, 270, 71, 156/99, 108, 109
See application file for complete search history.

(56) References Cited

U.S. PATENT DOCUMENTS 4,192,905 A 3/1980 Scheibal
4,285,752 A 8/1981 Higgins
4,673,609 A 6/1987 Hill
4,781,782 A 11/1988 Luham et al.
5,079,981 A 1/1992 Singer et al.
5,131,301 A 7/1992 Gergek
5,431,767 A 7/1995 Koza et al.
5,512,808 A 4/1996 Clark, Jr. et al.
5,544,558 A 8/1996 Hughes
5,658,420 A 8/1997 Rossini
5,678,377 A 10/1997 Leopold
5,840,407 A 11/1998 Futhey et al.
6,050,166 A 4/2000 Gauler et al.
6,180,196 B1 1/2001 Glover et al.
6,202,524 B1 3/2001 Cunningham
6,372,075 B1 4/2002 Johnson
6,571,849 B1 6/2003 Erickson et al.
6,634,401 B1 10/2003 Kuhn et al.

(Continued)

FOREIGN PATENT DOCUMENTS

DE 42 12 867 A1 10/1993

(Continued)

OTHER PUBLICATIONS

3M™ Accentrim™ Products, www.3m.com/us/mfg_industrial/indtape.accentrim/index.jhtml, as visited Jan. 28, 2002.

(Continued)

*Primary Examiner*—George Koch
(74) *Attorney, Agent, or Firm*—Watts Hoffmann, Co. LPA

(57) ABSTRACT

A method and apparatus for applying aligned decorative tape patterns to opposite sides of a glass sheet. The glass sheet is positioned such that the first side of the glass sheet is accessible to a tape application head. A first tape pattern is automatically applied to the first side of the glass sheet with the tape application head by referencing a location and orientation of a first corner of the sheet. The sheet of glass is then turned over such that the second side is accessible to the tape application head. A second tape pattern is automatically applied to the second side of the glass sheet with the tape application head by referencing the location and orientation of the first corner. The first and second tape patterns are precisely aligned as a result of referencing the same corner of the glass sheet.

8 Claims, 13 Drawing Sheets

U.S. PATENT DOCUMENTS

| | | | | |
|---|---|---|---|---|
| 2002/0092593 | A1 | 7/2002 | Erickson | |
| 2002/0092608 | A1 * | 7/2002 | Erickson et al. | 156/247 |
| 2002/0170663 | A1 | 11/2002 | Dailey | |
| 2003/0056905 | A1 | 3/2003 | Kuhn et al. | |
| 2003/0084989 | A1 * | 5/2003 | Briese | 156/249 |

FOREIGN PATENT DOCUMENTS

| | | |
|---|---|---|
| EP | 0 770 754 A1 | 5/1997 |
| FR | 1120171 | 7/1956 |
| JP | 61-30313 | 2/1986 |

OTHER PUBLICATIONS

How to Apply, www.3m.com/us/mfg_industria...tape/accentrim/jhtml, as visited Jan. 28, 2002.

Where to Buy, www.3m.com/us/mfg_industria...tape/accentrim/jhtml/w_index.jhtml, as visited Jan. 28, 2002.

3M™ Accentrim™ Products, www.3m.com/products.mmm.c... NYTMLW46geGSTIT4S9TCgvGSTVB17KGRg1, as visited Jan. 28, 2002.

3M™ Accentrim™ Edge Bevel B100, www.3m.com/products/mmm.c...NYTMLW46geGSTIT4S9TCgvGSTVB17KGRg1, as visited Jan. 28, 2002.

Warranty & use on a single pane of glass, www.3m.com/us/mfg_industria...m/jhtml/WarrantyonSinglePane.jhtml, as visited Jan. 28, 2002.

3M's Warranty information for use of Accentrim™ tape in units, www.3m.com/us/mfg_industrial/indtape/accentrim/jhtml/UseIG.jhtml, as visited Jan. 28, 2002.

3M™ Precision Cutter M45, www.3m.com/products/mmm.c... NYTMLW46geGSTIT4S9TCgvGSTVB17KGRg1, as visited Jan. 28, 2002.

3M™ Precision Cutter M45s, 1 per case, www.3m.com.products.mmm.c...TIT4S9TCgvGSTVB17KGRg1GSFGSHQB44b1, as visited Jan. 28, 2002.

Application Table for 3M™ Accentrim™ Products, www.gedusa.com/accentrim3m.htm, as visited Jan. 28, 2002.

Accentrim™ Products, B100, B200, BW200, BW500, pp. 1-3, Nov. 5, 2001.

Helpful Hints for Application of 3M™ Accentrim™ Products, Technical Bulletin, pp. 1-2, Oct. 11, 1999.

Accentrim™ Products, Frequently Asked Questions Regarding use in the Window & Door Industry, Technical Bulletin, pp. 1-3, Jun. 4, 2001.

Frequently Asked Questions Regarding Accentrim™ Products, Marketing Bulletin, pp. 1-2, Oct. 10, 1999.

* cited by examiner

METHOD AND APPARATUS FOR APPLYING ALIGNED TAPE PATTERNS

FIELD OF THE INVENTION

The present invention relates to a method and apparatus for applying decorative tape patterns to glass and, more particularly, the present invention relates to a method and apparatus for applying aligned decorative patterns to opposite sides of a glass sheet.

BACKGROUND

Various types of tape have been developed that have a decorative appearance when applied to glass. For example, U.S. Pat. No. 4,192,905 to Scheibal describes a transparent strip of polymeric material used to imitate a beveled edge. The transparent strip has a wedge-shaped cross-section having an angle similar to a beveled edge. The transparent strip has adhesive on one side for affixing the strip to the glass to produce a beveled edge appearance. U.S. Pat. No. 5,840,407 to Futhey et al. describes an optical film for simulating beveled glass. The optical film has a structured surface for providing a simulated beveled appearance. The structured surface is formed of a plurality of spaced parallel grooves that form a plurality of facets that simulate beveled glass.

Various applicators have been developed for applying tape to a surface. For example, U.S. Pat. No. 6,571,849 to Erickson et al. discloses a tape applicator that includes a tape head having a base, a tape roll holder attached to the base and a tape application roller for applying a tape to a surface attached to said base, where the tape applicator includes a tape path from the tape roll holder to the tape application roller. The tape applicator includes a x-axis actuator operatively connected to the tape head for moving the tape applicator in the x-axis direction and a y-axis actuator operatively connected to the tape head for moving the tape applicator in the y-axis direction.

SUMMARY

The present invention concerns a method and apparatus for applying aligned decorative tape patterns to opposite sides of a glass sheet. In one method of applying aligned tape patterns to first and second sides of a glass sheet, the glass sheet is positioned such that the first side of the glass sheet is accessible to a tape application head. A first tape pattern is automatically applied to the first side of the glass sheet with the tape application head by referencing a location and orientation of a first corner of the sheet. The sheet of glass is then turned over such that the second side is accessible to the tape application head. A second tape pattern is automatically applied to the second side of the glass sheet with the tape application head by referencing the location and orientation of the first corner. The first and second tape patterns are precisely aligned as a result of referencing the same corner of the glass sheet.

In one embodiment, the location and orientation of the first corner is determined using two separate fixtures. In this embodiment, the first corner of the glass sheet is aligned with a first home position fixture when the first side is accessible to the tape application head to determine the position and orientation of the first corner. The first corner of the glass sheet is aligned with a second home position fixture when the second side is accessible to the tape application head to determine the position and orientation of the first corner.

In one embodiment, a second tape pattern may be applied to the first and/or second side of the glass sheet. For example, a second tape pattern may provide the appearance of a bevel when applied to a glass surface may be applied to one side of a glass sheet.

A tape applicator for applying aligned tape patterns to first and second sides of glass sheets includes a glass support, a tape head, an x-axis actuator, a y-axis actuator, and a controller. The glass support includes a first home position fixture and a second home position fixture. The tape head includes a base, a tape roll holder attached to the base, and a tape application roller for applying the tape to the glass surface. The tape head defines a tape path from the tape roll holder to the tape application roller. The controller is programmed to automatically apply a first tape pattern to the first side of the glass sheet with the tape head by referencing the first home position fixture. The controller automatically applies a second tape pattern to the second side of the glass sheet with the tape head by referencing the second home position fixture.

Additional features of the invention will become apparent and a fuller understanding obtained by reading the following detailed description in connection with the accompanying drawings.

DETAILED DESCRIPTION

Figure 1:
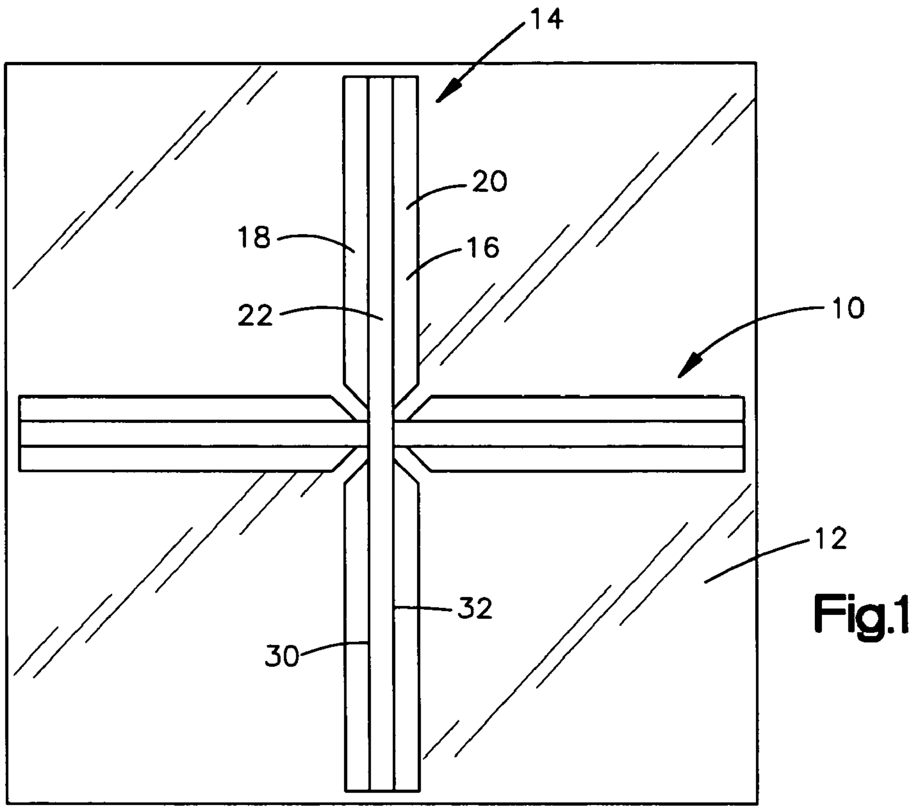
FIG. 1 is an illustration of a decorative tape pattern applied to a glass sheet.

The present disclosure is directed to patterns 10 of decorative tape applied to glass sheets 12, such as window lites, to a decorative tape 22 that is configured to overly a second type 16 of decorative tape, to a tape head 100 for applying decorative ductile tape 14 to glass sheets, and to a tape applicator 200 for applying aligned decorative patterns 10 to opposite sides of a glass sheet 12.

FIGS. 1–4 illustrate decorative or ornamental tape patterns 10 or configurations applied to a glass sheet 12. The decorative patterns illustrated by FIGS. 1, 3 and 4 include a first decorative tape strip 18, a second decorative tape strip 20, and a third decorative tape strip 22. In the embodiment illustrated by FIGS. 1, 3 and 4, the first and second decorative tape strips 18, 20 have approximately the same appearance and thickness. The first and second decorative tape strips are typically the same type of tape applied from a single tape roll 24. As one example, the first and second tape strips could be ACCENTRIM™ tape, which is approximately 0.010 inches thick. The ACCENTRIM™ tape provides the appearance of a bevel when applied to glass sheets. The second decorative tape strip 20 is applied to the glass sheet 12 in a spaced apart relationship to the first decorative tape strip 18. In the exemplary embodiment, the third decorative tape strip 22 has an appearance that is different than the appearance of the first and second tape strips 18, 20. For example, the third decorative tape strip 22 may be a lead strip 26 with an adhesive backing 28 or may be a tape that provides the appearance of lead when applied to the glass sheet 12. The third decorative tape strip 22 is applied to the glass surface between the first and second decorative tape strips 18, 20 such that edges 30, 32 of the third decorative tape strip overly the first and second decorative tape strips. This creates a seamless transition between the first and second strips 18, 20 and the third strip 22. Small application tolerances created during the application of any of the tape strips 18, 20, 22 will not show a visible gap between the two different types of tape.

Since the third strip 22 overlies the first and second strips 18, 20, the first decorative and second decorative tape strips are applied to the glass surface first. The third decorative tape strip 22 is then applied at least partially between the first and second decorative tape strips.

Figure 3:
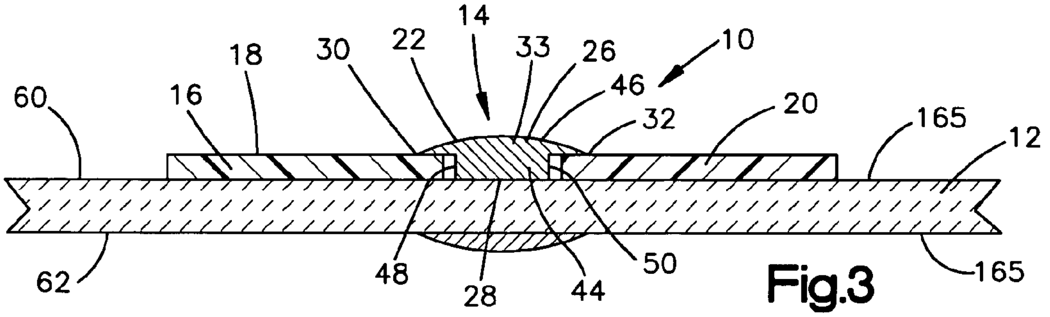
FIG. 3 is an section view of a decorative tape pattern applied to a glass sheet.
Figure 4:
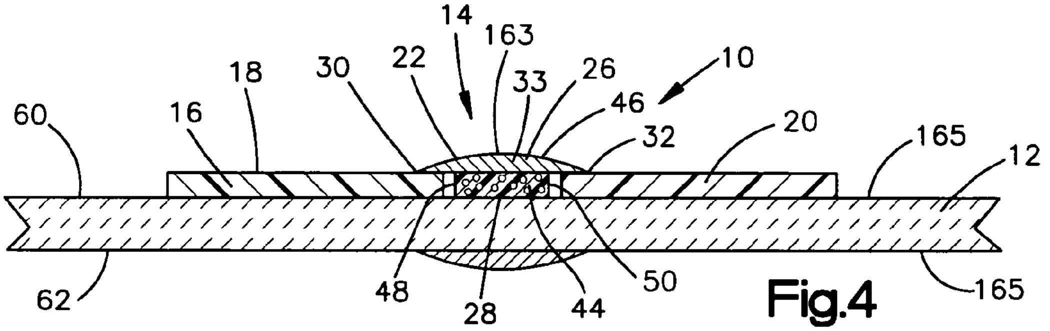
FIG. 4 is an section view of a decorative tape pattern applied to a glass sheet.

FIGS. 3 and 4 illustrate cross-sections of an elongated decorative tapes 22 suitable for use in the decorative pattern 10 illustrated in FIG. 1. The tapes include a base portion 44 and a decorative portion 46. The decorative portion 46 is supported by the base portion 44 such that first and second decorative portion edges 30, 32 extend beyond first and second edges 48, 50 of the base portion.

In the illustrated embodiments, the base portion cross-section is rectangular and the outer surface of the decorative portion is arcuate. In one embodiment, the base portion 44 is approximately 0.010" thick or slightly thicker than 0.010", corresponding to 0.010" decorative tape. In the embodiment illustrated by FIG. 3, the base portion 44 and the decorative portion 46 are integrally formed. The base portion and the decorative portion may at least partially comprise lead or be formed from a material that provides the appearance of a lead bead when applied to glass.

In the embodiment illustrated by FIG. 4, the base portion 44 and the decorative portion 46 are separately formed. For example, the base portion may be an adhesive foam backing adhered to the decorative portion 46. The decorative portion may at least partially comprise lead or be formed from a material that provides the appearance of a lead bead when applied to glass.

Figure 2:
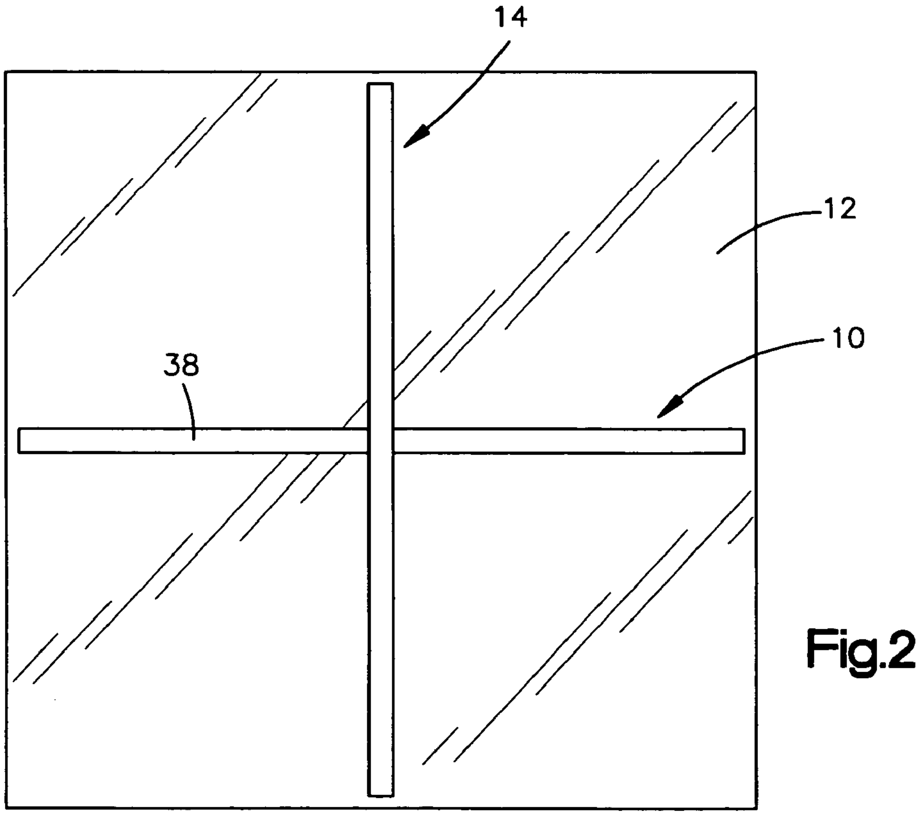
FIG. 2 is an illustration of a decorative tape pattern applied to a glass sheet.
Figure 2A:
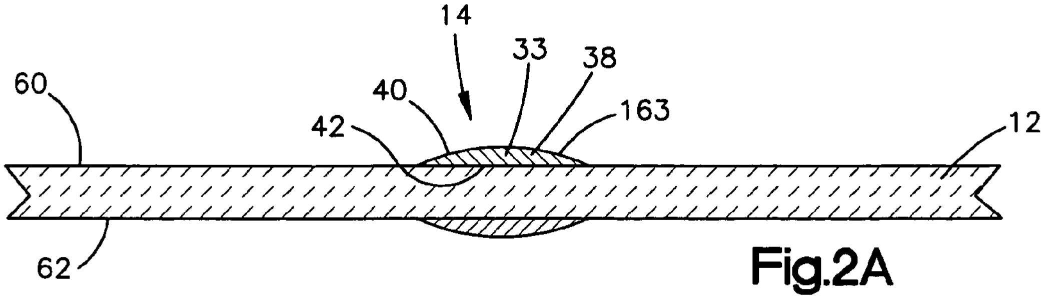
FIG. 2A is an section view of a decorative pattern applied to a glass sheet.

FIGS. 2 and 2A illustrates a decorative tape pattern 10 that includes only one type of tape 38. The tape strip 38 used in the pattern 10 illustrated by FIGS. 2 and 2A may be lead tape, or a tape that provides the appearance of lead when applied to a glass sheet 12. The cross-section of the tape strip 38 illustrated by FIG. 2A includes arcuate outer surface 40 and a flat, glass abutting surface 42. An adhesive is applied to the glass abutting surface 42 to adhere the tape 38 to the glass sheet 12.

Lead tape is very ductile. This makes it more difficult in some respects to apply to glass sheets and to cut than relatively more stiff tapes, such as ACCENTRIM™ tape. For example, bends in the lead tape that occur as the lead tape travels through the tape head tend to be retained when the tape is applied to the glass sheet. The blades of traditional cutoff tools included in tape dispensing heads are spread apart by the thicker, ductile lead tape. The ductile property of lead tape also makes it possible to apply curved patterns to the glass sheet. One aspect of the present invention is an improved tape head 100 that includes features that allow smooth lengths of ductile tape 22 to be applied, that facilitate cutting of thicker, ductile tape and/or that allow curved segments of ductile tape 22 to be applied to glass sheets 12. These features are described below in detail in the context of an overall tape applicator 200.

The tape applicator 200 includes a tape head 100 and a tabletop 52. With the use of actuators, the tape head 100 moves to different locations on the tabletop 52 to apply tape to an article on the tabletop 52, such as a sheet of glass 12. The tape head 100 applies lengths of tape to a sheet of glass 12 to create decorative patterns. The tape applicator 200 is especially useful for applying decorative tape including lead tape that simulates the appearance leaded glass and optical film that simulates an etched, grooved, or beveled appearance. One such optical film is described in U.S. Pat. No. 5,840,407. Such tapes having the optical film disclosed in U.S. Pat. No. 5,840,407 are commercially available as 3M™, Accentrim™ Tape, from 3M Company, located in St. Paul, Minn. These tapes are referred to herein as ACCENTRIM™ tapes.

Figure 6:
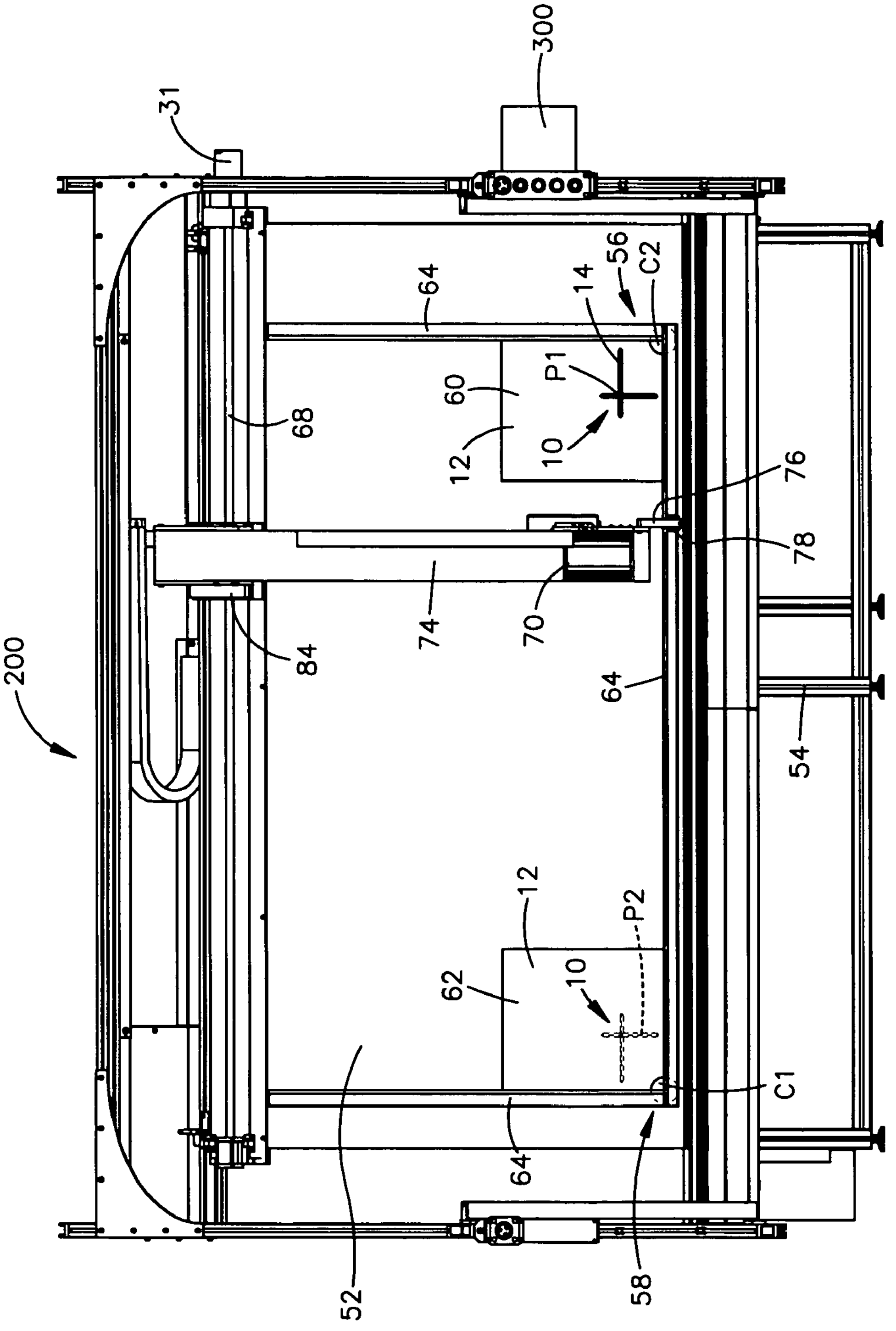
FIG. 6 is an elevational view of a tape applicator.
Figure 8:
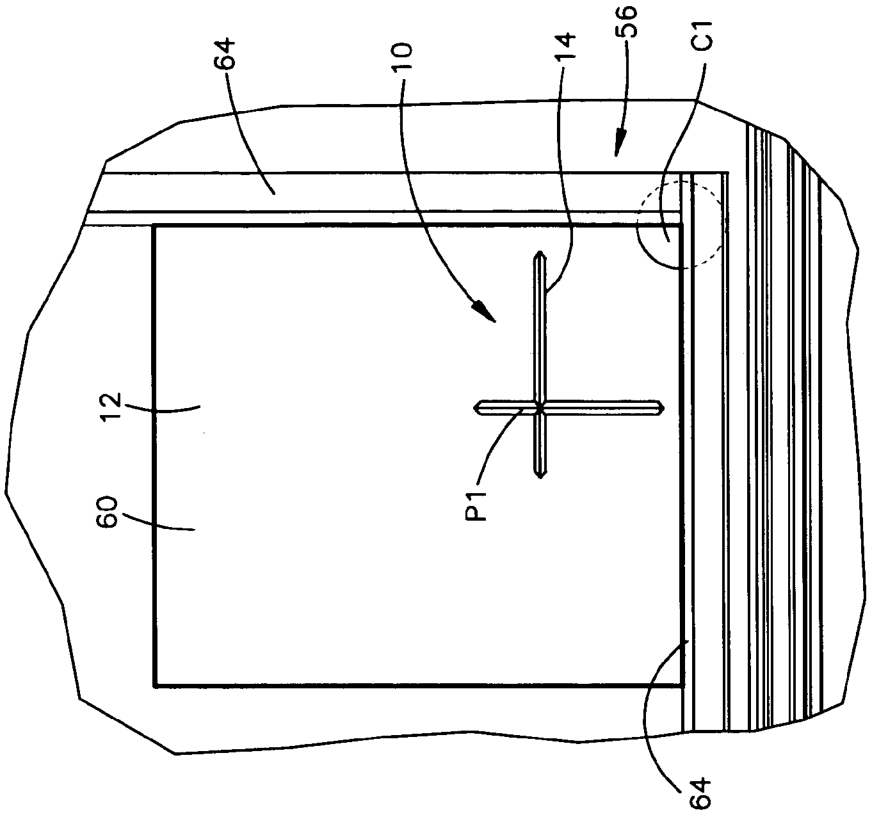
FIG. 8 shows an enlarged portion of the tape applicator of FIG. 6 showing a second home fixture.
Figure 7:
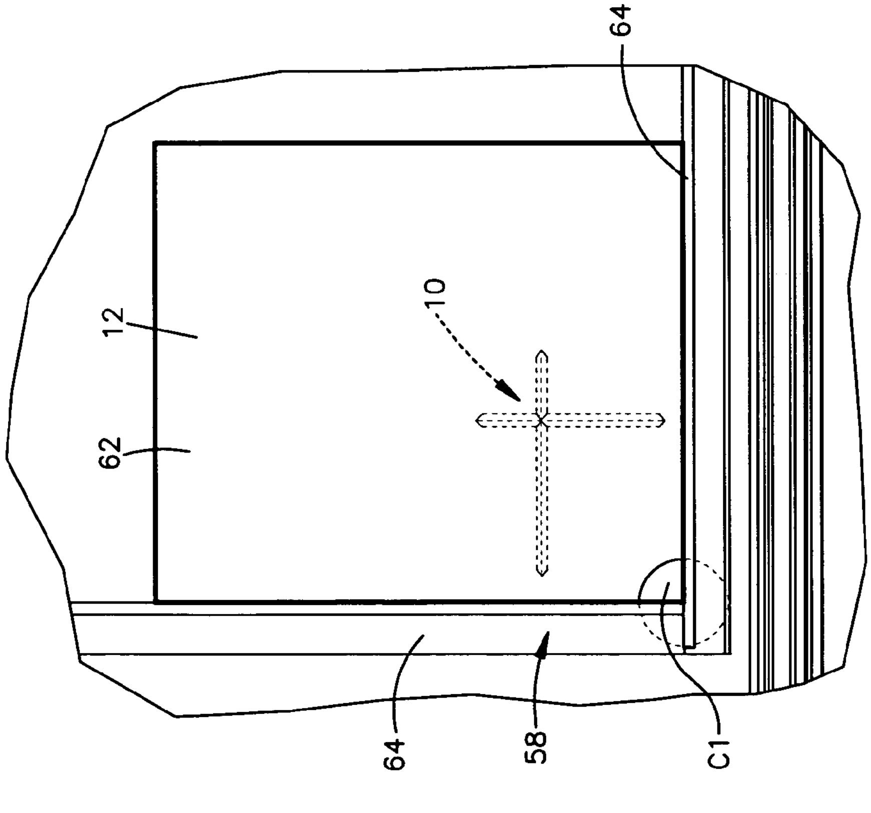
FIG. 7 shows an enlarged portion of the tape applicator of FIG. 6 showing a first home fixture.

The tape applicator 200 preferably includes a frame 54 for holding the tabletop 52. The tabletop 52 is preferably tilted to allow a user to easily place a sheet of glass 12 on the tabletop 52. In the exemplary embodiment, the tabletop 52 includes a first home position fixture 56 located on one side of the tabletop and a second home position fixture 58 located on an opposite side of the tabletop. Referring to FIGS. 6–8, the first and second home position fixtures 56, 58 allow the same corner C1 to be referenced when tape is applied to opposite sides 60, 62 of a glass sheet. This allows tape patterns 10 applied to the opposite sides 60, 62 to be aligned, even if the glass size is off or the glass sheet is not square. In the illustrated embodiment, the first and second home position fixtures are formed by guard panels 64 located at opposite ends of the tabletop 52 and a guard support member 66 extending between the two opposite guard panels 64. The tabletop 52 may optionally include a vacuum system for holding the sheet of glass stationary on the tabletop 52. The tabletop 52 and frame 54 are sized to handle desired sizes of glass.

The tabletop 52 defines an x-axis and an y-axis in the plane of the tabletop and a z-axis perpendicular to the tabletop 52. The tape applicator 200 includes a x-axis actuator 68, a y-axis actuator 70 and a z-axis actuator 72 for supporting, moving, and positioning the tape head 100 at different locations on the tabletop 52. The y-axis actuator 70 includes a support arm 74 that extends in the y-axis direction of the tabletop 52. The y-axis actuator 70 is moved in the x-axis direction by the x-axis actuator 68. Referring to FIG. 6, the end of the support arm 74 opposite the x-axis actuator includes a leg 76 and a wheel 78 attached to the leg, which supports the support arm 74 above the tabletop 52 and allows the support arm 74 to move along the tabletop 52 in the x-axis direction. The y-axis actuator 70 moves the tape head 100 in the y-axis direction of the tabletop 52 along the support arm 74.

Figure 5:
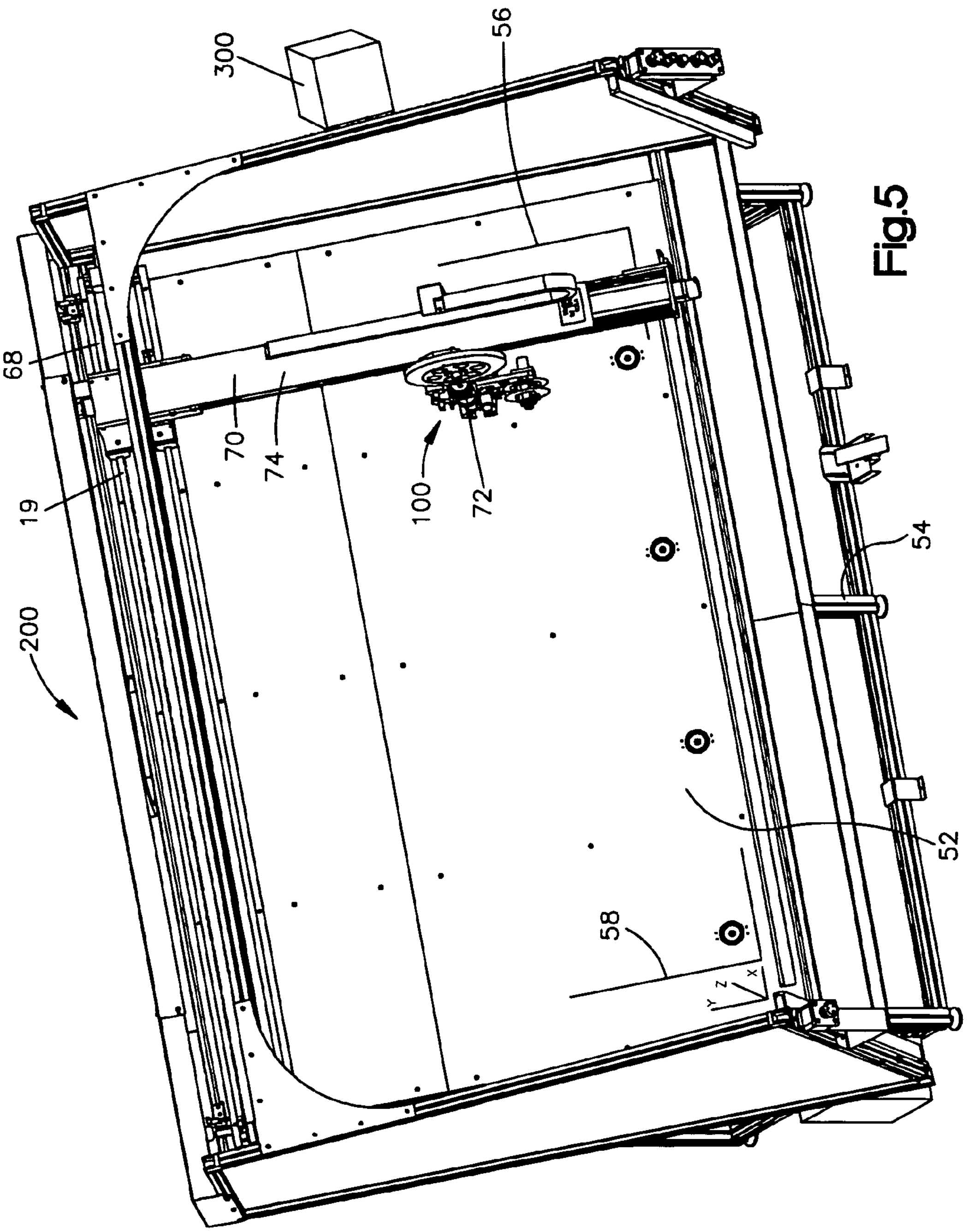
FIG. 5 is a perspective view of a tape applicator.
Figure 10:
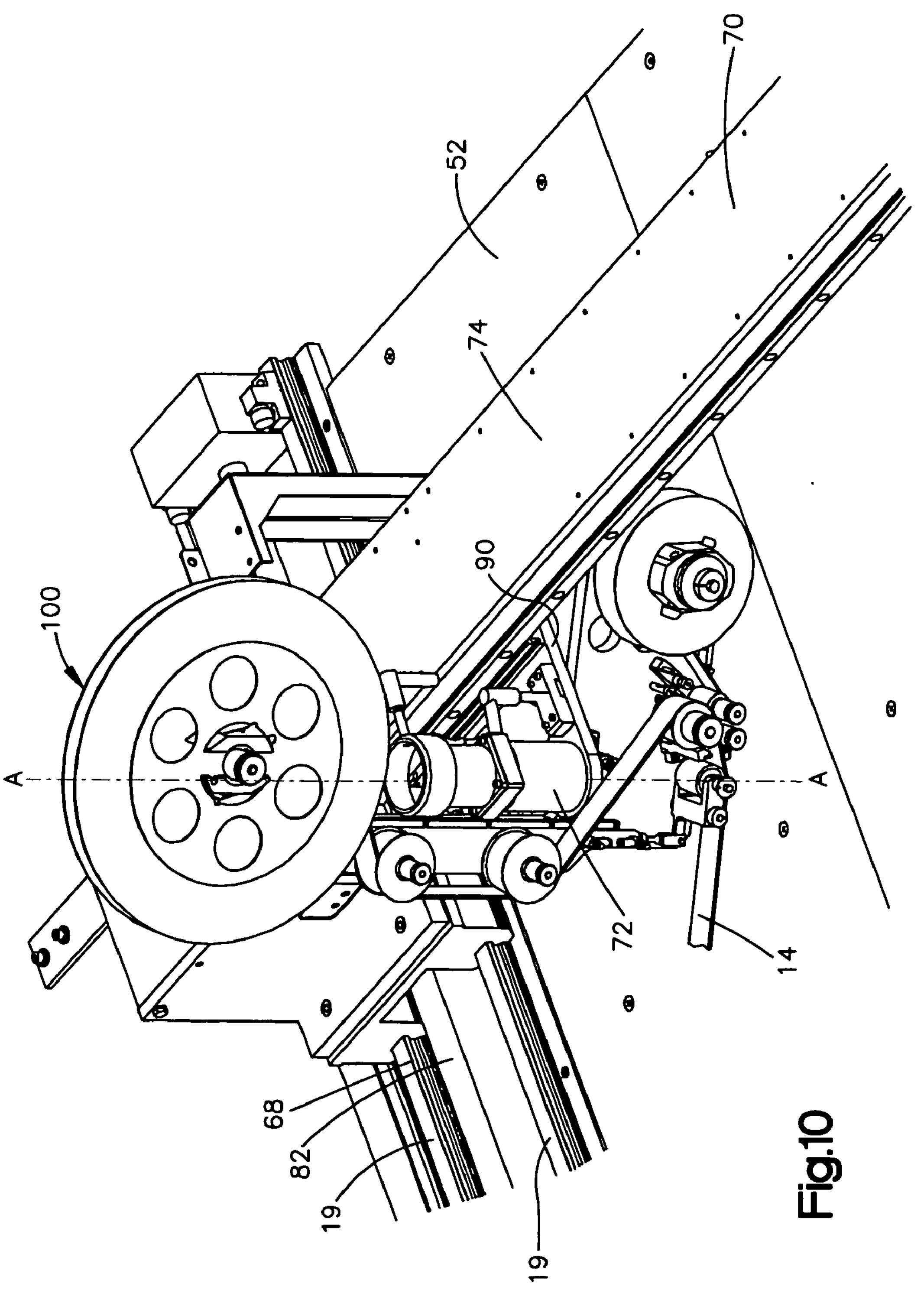
FIG. 10 is a perspective view of a portion of the tape applicator showing the tape head rotated about a z-axis.

FIG. 5 illustrates the tape head 100 positioned above the tabletop 52. FIG. 10 illustrates the tape head 100 applying decorative tape 14 to the sheet of glass 12 as the tape head 100 moves. To move the tape head 100 along the x-axis of the tabletop 52, the support arm 74 is moved by the x-axis actuator. To move the tape head 100 along the y-axis of the tabletop 52, the tape head moves along the support arm 74. The tape head 100 may move to a first location on the tabletop 52, start applying tape to the sheet of glass 12. The tape head 100 continues applying tape to the sheet of glass 12, as it moves to a second location on the tabletop 52.

Figure 9:
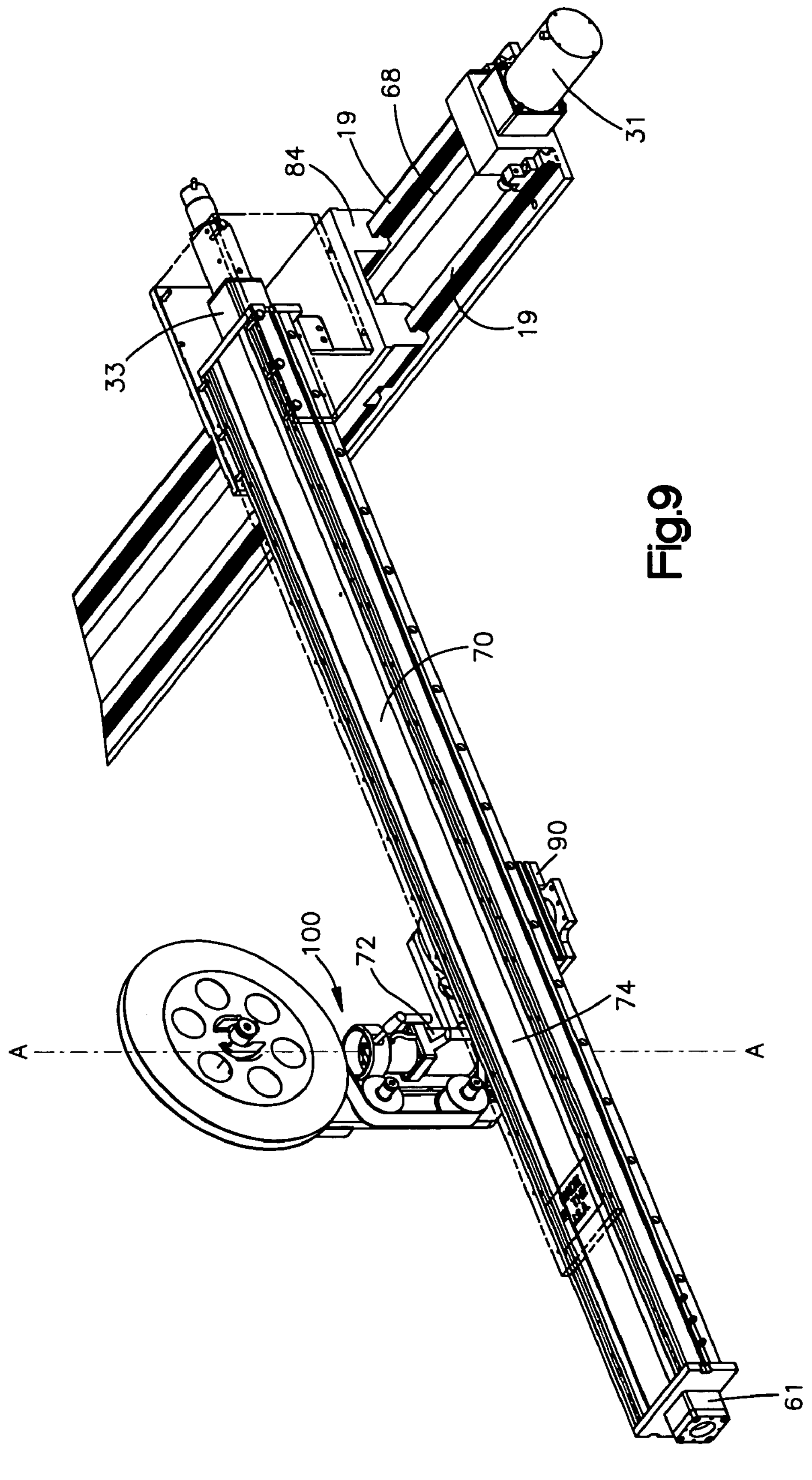
FIG. 9 is a perspective view of a portion of the tape applicator showing a portion of an x-axis actuator, a y-axis actuator, a rotary actuator and a tape head.

FIG. 9 illustrates a portion of the x-axis actuator 68 for moving the tape head 100 in the x-axis direction along the tabletop 52, the y-axis actuator 70 for moving the tape head 100 in the y-axis direction along the tabletop 52, and the z-axis actuator 72 for rotating the tape head with respect to the tabletop 52. The x-axis actuator 68 includes a motor 31, a ball screw 82, an end block that contains a bearing for the ball screw, rails 19, and a car 84 coupled to the rails 19 for moving the support arm 74. The support arm 74 is attached to the car 84. As the motor 31 turns the ball screw 82, the ball screw rotates to move the car 84 in the x-axis direction. As the car 84 moves, the support arm 74 and tape head 100 move with the car 84 across the tabletop 52. Any commercially available x-axis actuator capable of performing the functions described herein may be used. For example, a Linear System Actuator, sold under the trade name Thomson, which is commercially available from Thomson Industries, Inc., located in Port Washington, N.Y., sold under part number 2EB16FTBTL could be used. The motor 31 for the x-axis actuator is preferably a step motor. An example of a suitable step motor is sold under the trade name Compumotor, which is commercially available from Braas Company located in St. Paul, Minn., sold as part number CP*S57-102-MO-25.

The y-axis actuator 70 is similar to the x-axis actuator 68. The y-axis actuator also includes a motor 33, a ball screw (hidden by the support arm), an end block 61 that contains a bearing for the ball screw and a car 90 for moving the tape head 100 along support arm 74 in the y-axis direction of the tabletop 52. The tape head 100 is attached to car 90. As the motor 33 turns the ball screw 88, the car 90 moves in the direction of the y-axis of the tabletop 52. As the car 90 moves, the tape head 100 moves with the car 90 along the support arm 74. One acceptable y-axis actuator is a Linear System Actuator sold under the trade name Thomson, which is commercially available from Thomson Industries, Inc., located in Port Washington, N.Y., sold under part number 2RBM160DMKL1300. The motor 33 for the y-axis actuator is preferably a step motor. An example of a suitable step motor is a step motor sold under the trade name Compumotor, which is commercially available from Braas Company located in St. Paul, Minn., sold under the part number CP*S57-51-MO-25.

The rotary actuator 72 for rotating the tape head 100 around an axis A that is parallel to the z-axis. Any commercially available rotary actuator may be used. An example of a suitable step motor is sold under the trade name Compumotor, which is commercially available from Braas Company located in St. Paul, Minn., sold under the part number S83*135-MO-S. FIG. 10 illustrates the rotary actuator 72 rotating the tape head 100 about an axis of rotation A. The rotary actuator 72 is mounted to the car 90. The rotary actuator rotates the tape head 100 around the z-axis of the tabletop 52. As the rotary actuator 72 turns, the tape head 100 turns about axis A.

The tape head 100 is illustrated in FIGS. 11, 12, 14 and 15. The tape head 100 first begins applying tape to the sheet of glass 12 and then as the tape is being applied, the tape head cuts the tape with a cutting mechanism 116 to form the end of a first length of tape. The end of the first length of tape is then applied to the surface by the tape head.

Figure 11:
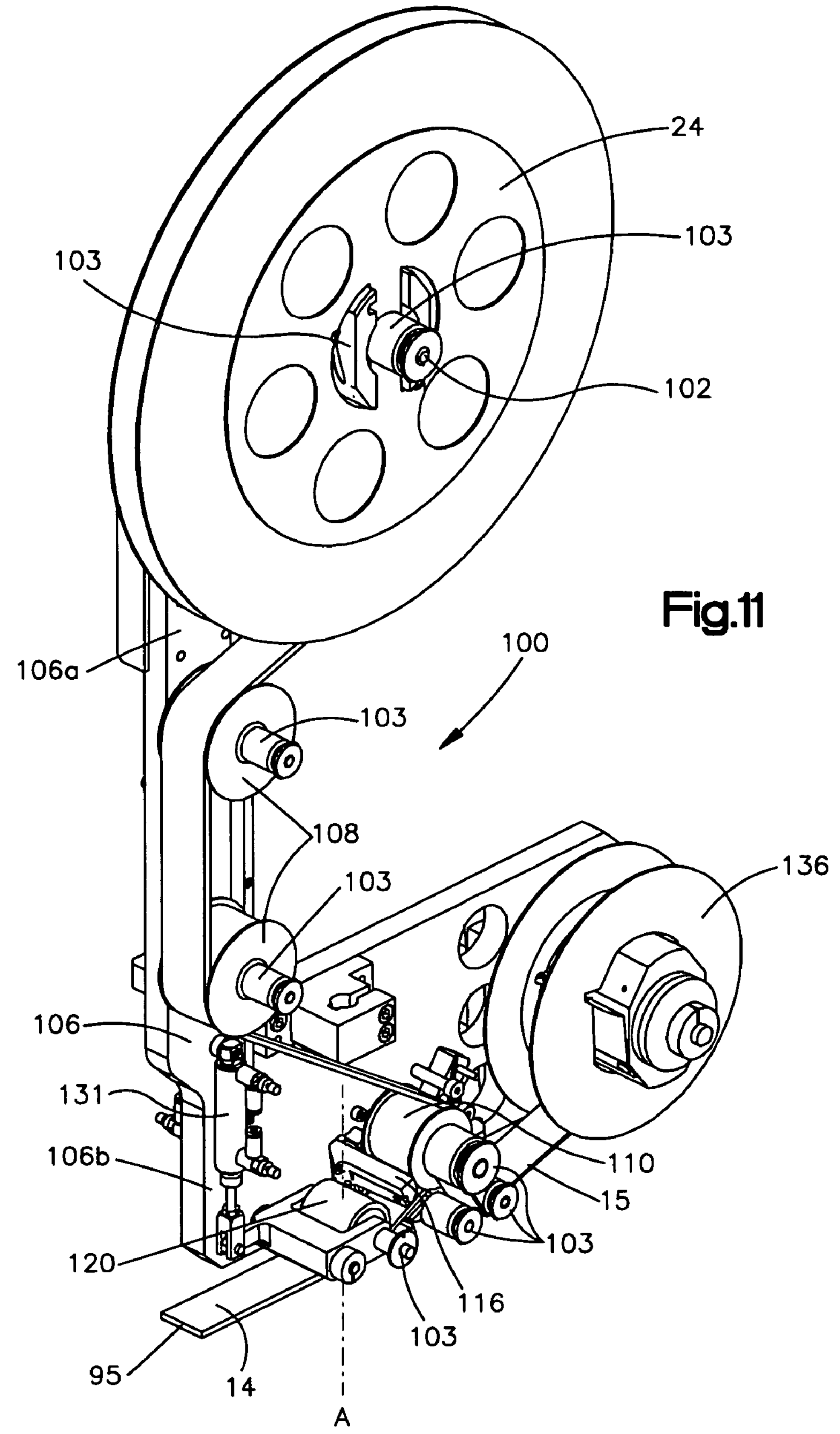
FIG. 11 is a perspective view of a tape head.

FIG. 11 illustrates one side of the tape head 100. The rotary actuator 72 for rotating the tape head about axis A has been removed for clarity. The tape head 100 includes a base 106. Preferably, the base 106 includes an upper base arm 106*a* and a lower base portion 106*b*. The tape head 100 includes a tape roll holder 102 and tape guide rollers 108 attached to the upper base arm 106*a*. The tape roll holder 102 is for receiving a roll of tape 24. The tape roll holder 102 preferably includes a friction clutch 103 to provide back tension on the tape 14 as it unwinds from the tape roll 24, so the tape does not continue to unwind from the roll 24 when the tape head 100 stops applying tape to the surface. Referring to FIG. 11, the tape rolls are easily mounted to the tape roll holder using a quick connect collar 103. The quick connect collar 103 and spacer rings allow the tape roll to be changed without a tool.

The tape head 100 also includes a drive roller 110, a pinch roller 118, a pivotal platen 122, the cutting mechanism 116, an application roller 120, and a liner take-up roller 136, all attached to the lower base portion 106*b*. In the exemplary embodiment, the guide rollers 108, 110, the drive roller 110, the pinch roller 118, the pivotal platen 122, the application roller 120, and the liner take-up roller 136 are all mounted using a quick connect collars 103. The quick connect collars 103 allow different sizes and types of tape 14 to be easily mounted and removed from the tape head 100.

Figure 12:
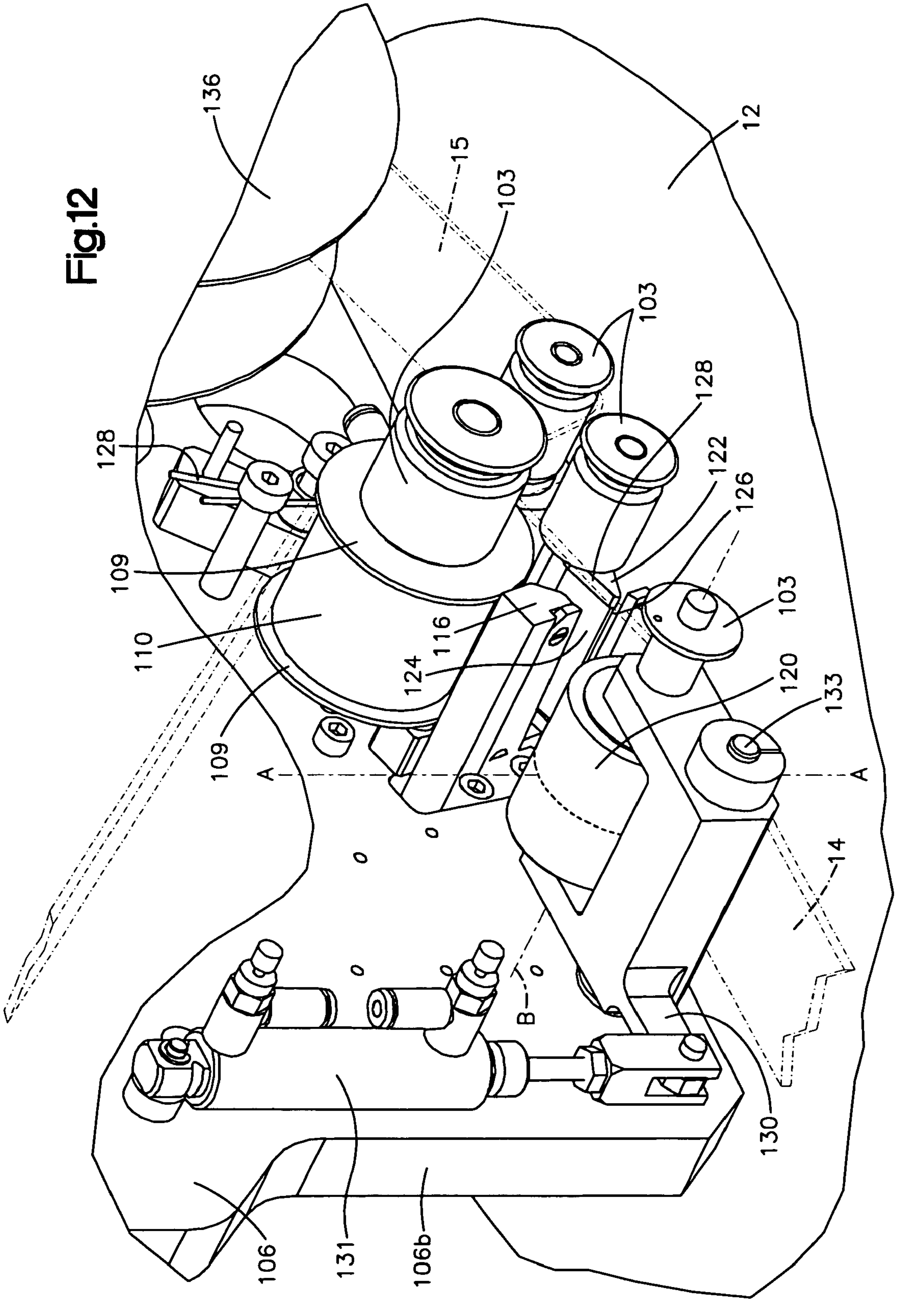
FIG. 12 is an enlarged perspective view of a portion of a tape head to illustrate application of tape to a glass sheet.
Figure 17:
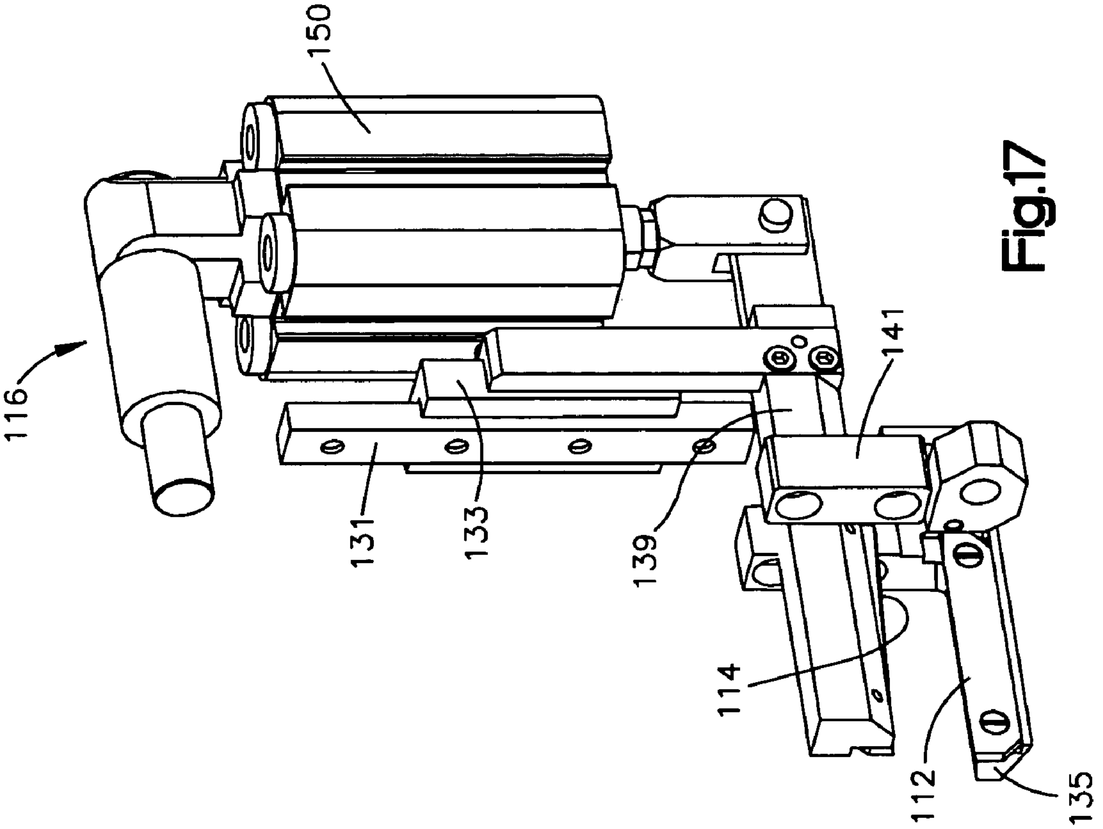
FIG. 17 is a perspective view of a cutting mechanism.

Referring to FIG. 17, the cutting mechanism 116 includes a fixed blade 112 and a moveable blade 114 that is restricted to linear movement with respect to the fixed blade. The application roller 120 is mounted to the lower base portion 106*b*. Referring to FIG. 12, the tape head 100 includes an application roller air cylinder 131 for pivoting a bracket 130 about pivot 133 to place the application roller 120 in contact with the tape 14 and the glass sheet 12.

In the exemplary embodiment, the tape 14 moves along the following tape head path:

1) from the tape roll holder 102 to the guide rollers 108;

2) then to the nip formed between the drive roller 110 and the pinch roller 118;

3) then to the pivotal platen 122 and over the platen;

4) then between the blades 112, 114 of the cutting mechanism 116, which are spread apart;

5) then under the application roller 120, which applies the tape 14 to the glass sheet 12.

In one embodiment, the tape head 100 is configured to minimize bending of the tape 14 along the path of travel between the drive roller 110 and the tape application roller. This reduces visible defects in the ductile tape, such as lead tape, applied to the glass surface. Lead tape has a high degree of bend memory. That is, when lead tape is bent it tends to stay bent. Bends retained in the lead tape produce visual defects. In this embodiment, the drive roller 110, the pinch roller 118, the pivotal platen 122 and/or the application roller 120 are configured to minimize bending of the tape between the drive roller 110 and the application roller 120.

Figure 16A:
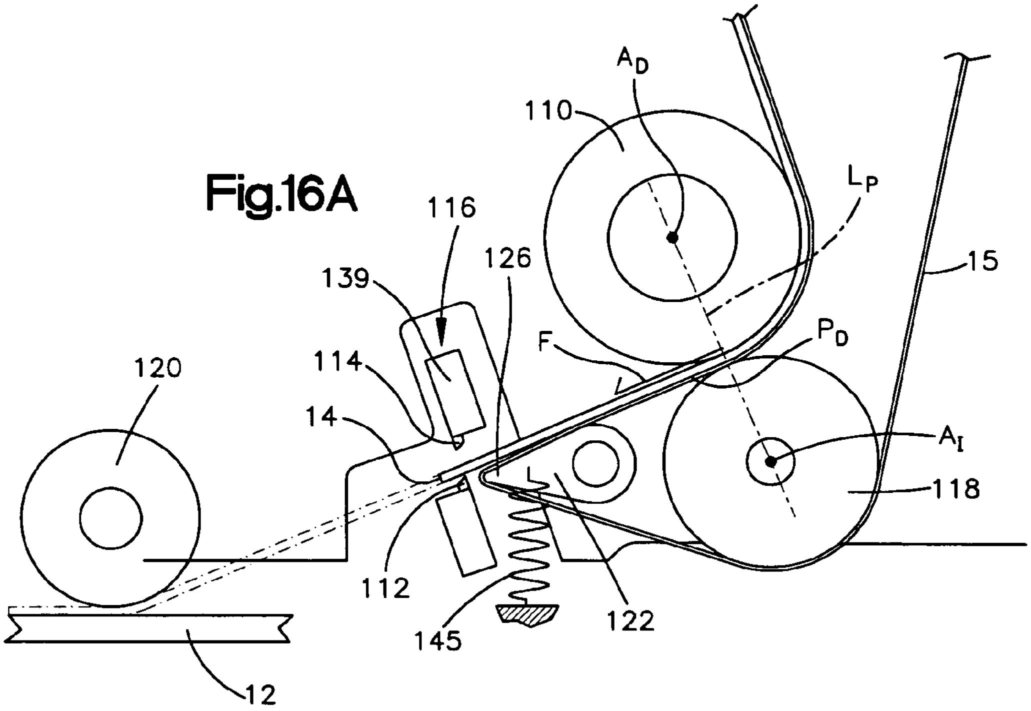
FIG. 16A is a schematic illustration of components of a tape head including a cutting mechanism in an open position.
Figure 16B:
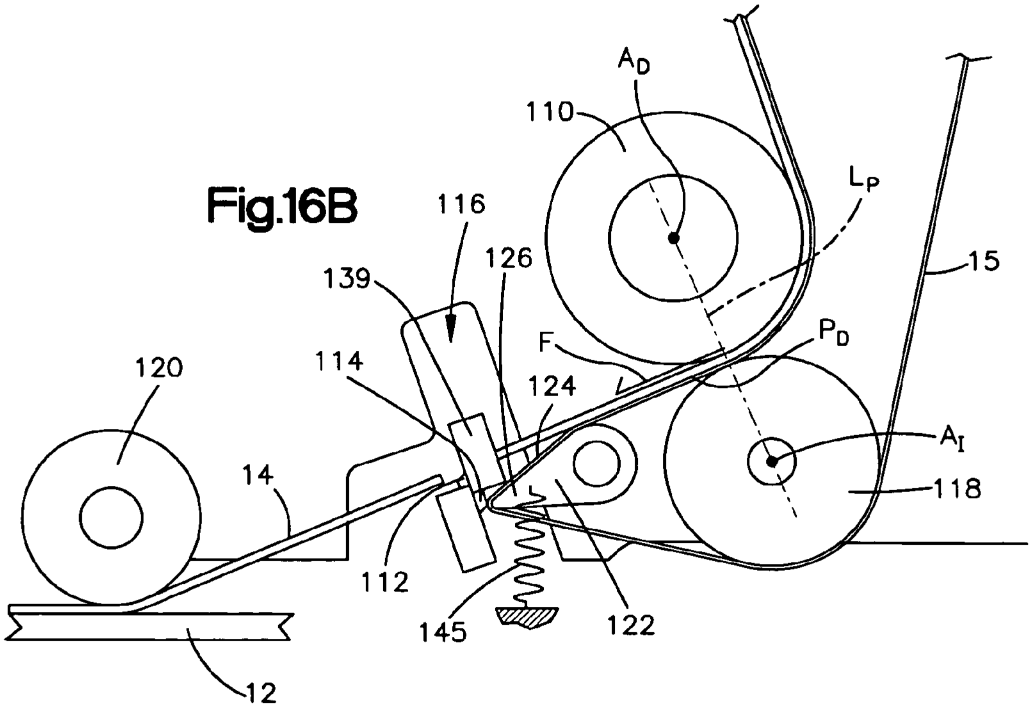
FIG. 16B is a schematic illustration of components of a tape head including a cutting mechanism in a closed position.

Referring to FIGS. 16A and 16B, one way of minimizing bending of the tape 14 is to locate the pinch roller 118 so that the direction of force F applied by the drive roller 110 to the tape 14 is in the direction of the desired tape travel. As a result, ductile tape payed out from the pinch roller 118 and the drive roller will immediately begin traveling toward the platen 122. If the pinch roll 118 is not positioned to align the force applied by the drive roller 110 with the desired path $P_D$ of travel, the tape exiting the pinch roller and drive roller will initially deviate from the desired path and then be directed along the desired path. As a result, bumps in the ductile tape will be formed. In the illustrated embodiment, the force F applied by the drive roller 110 is aligned with the desired path of travel $P_D$ by configuring the drive roller 110 and the pinch roller 118 such that a line $L_P$ connecting a drive roller axis of rotation $A_D$ and an idler roller axis of rotation $A_I$ is perpendicular to the line of travel $L_D$ of the tape defined by the platen 122. Orienting the pinch roller 118 and the drive roller 110 in this manner does not have an adverse effect on dispensing of more rigid tape, such as ACCENTRIM™ tape.

Referring to FIG. 16A, another way of minimizing bending of the tape 14 is to orient the platen 122 such that the path of travel from the nip formed by the drive roller 110 and the pinch roller 118 to the platen 122 and over the platen is a straight line. If the platen 122 is canted up or down with respect to the path of travel from the drive roll 110 and the pinch roll 118, the tape will bend when it reaches the platen 122. As a result, bumps in the ductile tape may be formed.

The pivotal platen 122 separates the liner 15 from the tape 14, as the tape 14 passes over the platen 122. After the liner 15 is separated from the rest of the tape 14, the liner winds around the pinch roller 118 and is taken up by the liner roller 136 (see FIG. 18). The liner 15 is separated from the rest of the tape 14 at the end of the pivotal platen 122. The liner is then wound around the pinch roller 118 and wound around the liner roller 136.

Figure 15:
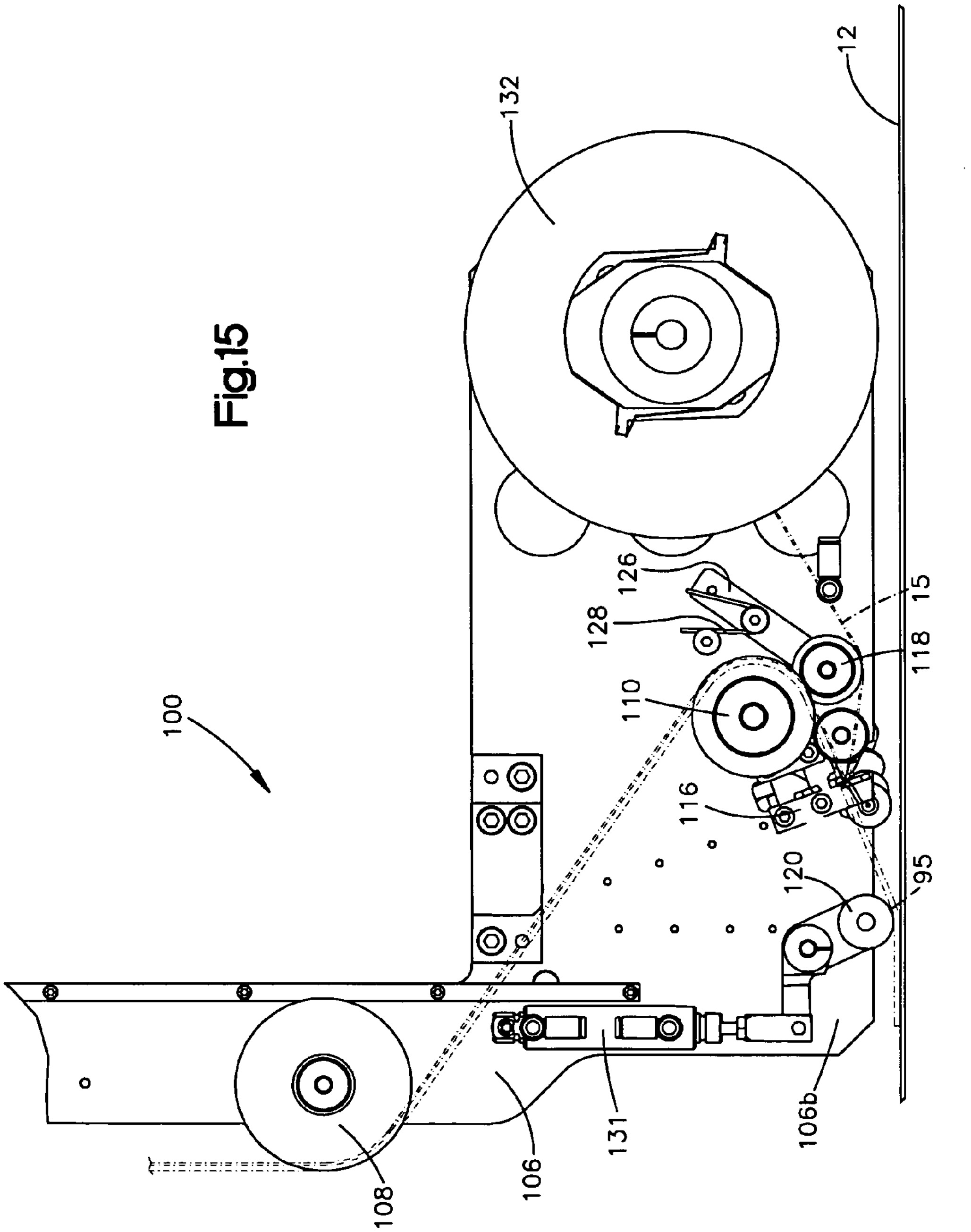
FIG. 15 is a side elevational view of a tape head.

When loading a new roll of tape 14 into the tape head 100, the tape is initially threaded through the tape head 100 according to the tape path outlined above. Referring to FIG. 15, the pinch roller 118 is mounted on a pinch lever 126. The pinch lever 126 may be rotated away from the drive roller 110 against the force of a biasing spring 128. This allows the tape 14 to be placed in the nip between the pinch roller 118 and the drive roller 110. The biasing spring forces the pinch roller against the drive roller. As such, tension in the liner 15 is not required to force the pinch roller against the drive roller. This allows tapes with weak backings to be dispensed by the head 100. For example, a lead tape with a paper liner could be dispensed by the head, because the paper liner is not required to force the pinch roller against the drive roller. If the paper liner of a lead tape were required to force the pinch roller against the drive roller, the paper liner would be likely to tear.

FIG. 12 illustrates a partial isometric view of the lower portion of the base **106*b*. The tape 14 winds around the drive roller 110 between two opposite tape guides 109. The tape guides 109 assist in keeping the tape 14 straight or from slipping off of the drive roller. The tape 14 then passes over the pivotal platen 122 along the guide surface 124. The guide surface 124 includes two opposite tape guides 128. The tape guides 128 also assist in keeping the tape 14 straight just prior to its application to the glass sheet by the application roller 120. The liner 15 is separated from the rest of the tape 14 at the edge 126 of the guide surface 124. The edge 126 of the guide surface 124 is preferably sharp to assist in separating the liner 15 from the rest of the tape 14. The guide surface 124 of the pivotal platen 122 is positioned to direct the tape 14 over the fixed blade 112 of the cutting mechanism 116. The moveable blade 114 is biased away from the fixed blade 112 to allow the tape to pass between the blades 112, 114 of the cutting mechanism 116. The tape is then applied to the glass sheet by the application roller 120**.

Figure 14:
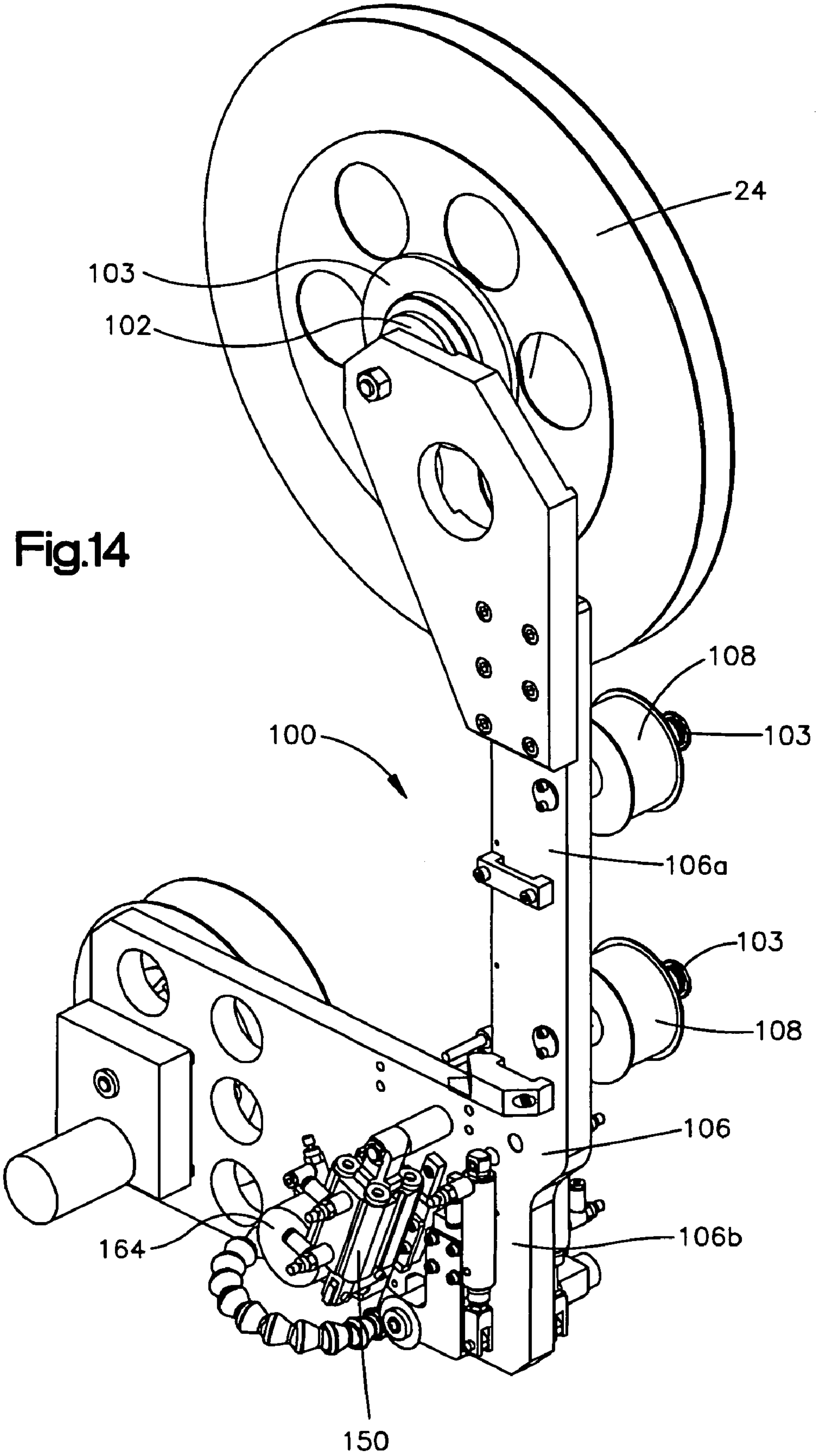
FIG. 14 is a perspective view of a tape head.

FIG. 14 illustrates the second side of the tape head 100, which is opposite the side of the tape head 100 illustrated in FIG. 11. The tape head 100 includes a rotary servo motor 164 mounted to the lower base portion **106*b* for driving the drive roller 110. The tape head also includes an air cylinder 150 attached to the lower base portion 106*b* for actuating the moveable blade 114 in the cutting mechanism 116**.

The tape 14 includes an adhesive layer 28 and a liner 15 covering the adhesive layer. Examples of tape that can be applied by the disclosed tape head 100 are ACCENTRIM™ tape and lead tape. Referring to FIG. 15, to start applying the tape to the surface, the tape end 95 is located under the application roller 120. The application roller air cylinder 131 actuates the application roller 120 into contact with the tape 14 and the glass sheet 12. Once the tape 14 is between the application roller 120 and the sheet 12, the adhesive layer bonds the tape 14 to the glass sheet by pressure. These steps are used to initially start applying the first end 95 of the tape 14 to the sheet of glass 12. To continue applying tape 14 to the glass sheet 12, the tape head 100 moves relative to the stationary sheet of glass 12, while the application roller 120 applies the tape 14.

Figure 13:
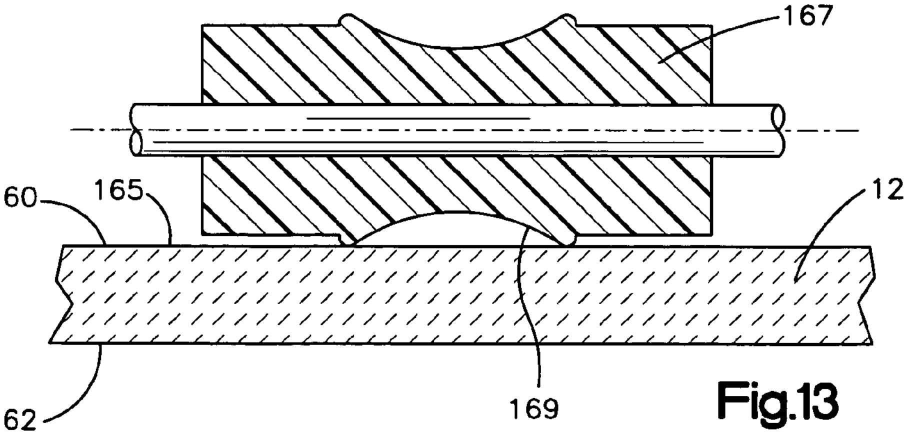
FIG. 13 is an illustration of tape application roller having a circumferential concavity.

Referring to FIG. 13, in one embodiment, the tape head 100 is adapted for applying a tape 14 having a curved profile 163 (FIGS. 2A and 4) to a glass surface 165. In this embodiment, tape head 100 includes a tape application roller 167 having a circumferential concavity 169 that corresponds to the curved tape profile 163 for pressing the tape to the glass surface 165. The concavity 169 can be slightly overcupped as compared to the tape profile 163 to apply more pressure to edges 30, 32 of the curved tape than a central portion 33 of the curved tape. The tape application roller 167 having a circumferential concavity 169 smooths out rippled edges of a tape strip, such as a lead tape strip, and also seals the edges from water penetration.

Figure 18A:
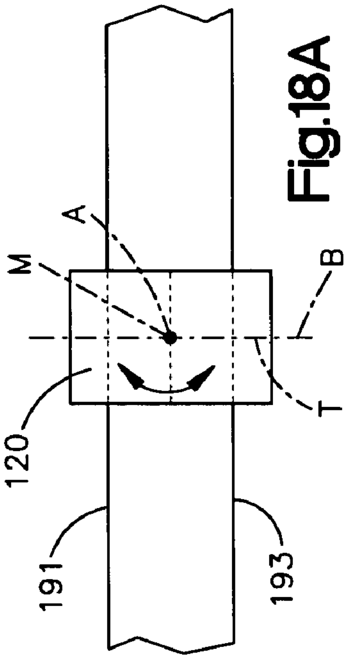
FIG. 18A is an illustration of a tape application roller centered on an axis of rotation of a tape head.
Figure 18B:
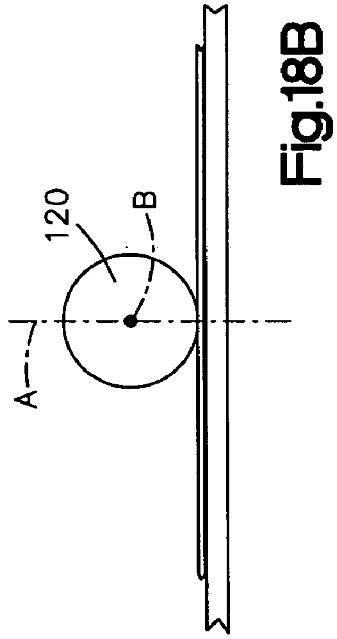
FIG. 18B is an illustration of a tape application roller centered on an axis of rotation of a tape head.

In one embodiment, the tape head 100 is adapted to apply curved patterns 183 of ductile tape to glass sheets. Referring to FIGS. 12, 18A, and 18B, in this embodiment, the tape application roller 120 is centered on the axis A of rotation of the tape head 100 such that the tape application roller 120 rotates about its midpoint M when the tape head rotates. That is, the axis A intersects the axis B of the tape application roller 120 at the midpoint M of the Tape application roller. Referring to FIG. 18, another way of describing this is that the pressure roller is attached to the base such that the tape application roller presses the tape against at least two points of the glass surface along a line of tangency T that extends from a first edge 191 of the tape to a second edge 193 of the tape. The axis of rotation A intersects a midpoint of the line of tangency that extends between the tape edges. Centering the application roller with the axis of rotation A of the tape head permits arced ductile tape segments to be applied without a "caster" effect from creating undesired offsets from the intended arc.

In one embodiment, curved tape segment patterns that are stored in a controller memory are automatically applied to a glass surface. The tape head is moved along a path stored in a controller memory. The controller controls the tape head to dispense curved patterns of tape onto the glass surface. This is facilitated by aligning the midpoint of a tape application roller carried by the tape head with an axis of rotation of the tape head.

In the exemplary embodiment, the cutting mechanism is adapted to cut a thick, ductile tape, such as a tape that provides the appearance of leaded glass when applied. FIG. 17 illustrates the cutting mechanism 116 for cutting the tape just prior to where the tape is applied to the sheet of glass 12. The cutting mechanism 116 includes the fixed blade 112, a first linear bearing component 131, a second linear bearing component 133, the linearly moveable blade 114, and the blade actuator 150. In the illustrated embodiment, the a stationary blade 112 is coupled to the frame by a stationary blade bracket 135. The first linear bearing component 131 is also coupled to the frame. The second linear bearing component 133 is coupled to the first linear bearing component 131 such that the second linear bearing component is constrained to linear movement with respect to the first linear bearing component. The moveable blade 114 is connected to the second linear bearing component by a moveable blade bracket 139. The moveable blade 114 is constrained to linear movement with respect to the fixed blade 112. The actuator 150 is coupled to the moveable blade 112 and the frame 114 for moving the moveable blade along a linear path with respect to the fixed blade to cut the lead tape. In the illustrated embodiment, a backing member 141 fixed to the frame is positioned behind the moveable blade bracket 139 to prevent movement of the moveable blade away from the fixed blade. The cutting mechanism provides sufficient clearance and support for wide lead tape strips, such as 18 mm wide lead tape, and allows for easier blade gap setting. The linear bearing arrangement helps maintain alignment of the blade while maintaining the rigidity of the bladeholders.

The cutting mechanism 116 cuts the tape 14 transversely when the air cylinder 150 actuates to force the moveable blade 114 to move along a linear path and contact the fixed blade 112. Referring to FIG. 16A, the moveable an fixed blades are normally in a spaced apart relationship. A biasing spring 145 biases the pivotable platen 122 to the position illustrated in FIG. 16A. Referring to FIG. 16B, as the moveable blade 114 moves to contact the fixed blade 112, the pivotal platen 122 is pushed counter clockwise by the moveable blade bracket 139 against the force of a biasing spring 145 to move the guide surface 124 away from the blades 114, 116 of the cutting mechanism 116.

To apply the second end 151 of the tape 14, the tape head 100 continues moving relative to the sheet of glass to allow the application roller 120 to press the remaining tape 14 against the glass sheet 12. The air cylinder 150 moves the moveable blade 114 again to move the moveable blade 114 out of contact with the fixed blade 112. At the same time the moveable blade 114 moves out of contact with the fixed blade 112, the pivotal platen 122 rotates clockwise under the force of the biasing spring to move the platen toward the blades 114, 116 of the cutting mechanism 116, between the blades 114, 116 to allow the tape 14 to pass through the cutting mechanism 120 when the tape advances.

To operate the x-axis actuator 68, y-axis actuator 70, and rotary actuator 72 to move the tape head 100, the tape applicator 200 preferably includes a computer processor/controller 300 for sending signals to the actuators 68, 70, 72 to move the tape head 100 relative to the tabletop 52. The computer processor and controller then determines which way to direct the actuators 68, 70, 72 to move the tape head 100 to apply the tape to the glass and to cut the tape. In one embodiment, the computer processor and controller is an "open loop" system, which calculates where the tape head 100 is located on the tabletop 52, based on a known series of moves. For example, the ball screw in either the x-axis actuator 68 or y-axis actuator 70 will move the tape head 100 a known distance per one rotation of the ball screw. If the computer processor knows the initial location of the tape head 100, like the first home position, or the second home position, it can determine the final location of the tape head 100, based on how many rotations the ball screws actually rotated. The computer processor will send a signal to the x-axis and y-axis actuators 68, 70 to turn the ball screws a calculated number of rotations to move the tape head 100 a certain distance in a given direction. The computer processor also sends signals to the rotary actuator 72 to rotate the tape head 100 relative to the z-axis of the tabletop 52. A suitable controller 300 is a controller sold under the trade name Compumotor, which is commercially available from Braas Company located in St. Paul, Minn., sold under part number 6K4. In another embodiment, the computer processor is a "closed loop" system, which calculates where the tape head 100 is at all times on the tabletop 52.

In the exemplary embodiment, the controller is programmed for quick tooling changes. The changeover from one size or type of tape is done with quick release collars. A software offset library is stored in a memory of the controller. The software offset library retains settings that are specific to the set of parts (guide rollers, drive roller, pinch roller, platen, application roller) that correspond to each size/type of tape. As a result, it is not necessary to mechanically alter one set of parts to respond similarly to other sets of parts. The software offset library is used to adjust the application settings of the head 110, to apply different sizes/types of tape in a similar fashion. The controller is also programmed to allow one set of parts to operate in more than one way. For example, the controller is programmed to use the same set of parts to apply a straight tape strip and a curved tape strip.

To determine the initial location of the tape head 100 on the tabletop 52, the actuators 68, 70, 72 preferably include sensors to determine the location. Suitable sensors for the actuators 68, 70, 72 are Prox Sensors sold under the trade name Omron, which is commercially available from Braas Company located in St. Paul, Minn., sold under part number E2E-X1R5E1-M1-N.

In one embodiment, the tape applicator 200 is adapted to apply aligned decorative patterns 10 to opposite sides of a glass sheet 12. Referring to FIGS. 6–8, the user positions the glass sheet such that the first side 60 of the glass sheet is accessible to a tape application head 10. The controller controls the head 110 to automatically apply a first tape pattern P1 to the first side 60 of the glass sheet 12 by referencing a location and orientation of a first corner C1. The glass sheet is turned over such that the second side 62 is accessible to the tape application head 100. In the exemplary embodiment, the controller prompts the operator to flip the glass over. The controller controls the head 110 to automatically apply a second tape pattern P2 to the second side 62 of the glass sheet 12 with the tape application head 100 by referencing the location and orientation of the first corner C1. By referencing the same corner C1 when applying the tape to the first side 60 and the second side 62, the first tape pattern can be aligned with the second tape pattern even if the glass sheet is not the correct size or is not square.

In the illustrated embodiment, the first home position fixture 56 is used to align the first corner C1 of the glass sheet when the first side 60 is accessible to the tape application head to determine the position and orientation of the first corner. The second home position fixture 58 is used to align the first corner C1 of the glass sheet when the second side 62 is accessible to the tape application head to determine the position and orientation of the first corner. In the illustrated embodiment, the controller is programmed to automatically apply a first tape pattern to the first side of the glass sheet with the tape head by referencing the first home position fixture and to automatically apply a second tape pattern to the second side of the glass sheet with the tape head by referencing the second home position fixture.

In an alternate embodiment, the position and location of the corner C1 when the sheet is on the first side may be determined by detecting edges of the sheet with a sensor, such as an optical sensor. The glass sheet is then flipped over to apply the tape to the other side. The position and location of the corner C1 when the sheet is on the second side may again be determined by detecting edges of the sheet with a sensor, such as an optical sensor.

In one embodiment, a second tape type pattern is applied to one of the sides of the glass sheet. For example, the aligned patterns on the opposite sides of the sheet may be patterns of lead tape and a pattern a pattern of tape that provides the appearance of a bevel may be applied to only one side of the sheet.

Applying lead tape strips to both sides of the glass requires that they are directly on top of each other so that the glass appears to have been actually leaded. An offset of the lead strip on the inside and outside surfaces will create a visual defect. If the same home position on the table is used as the reference point, a different corner of the glass sheet will be referenced when the glass sheet is flipped. If the glass size is different than the desired (programmed) size, an offset will occur between the inner and outer lead strips. Use of a second home position on the table so that the same corner on the glass sheet is referenced eliminates this chance of error.

Although the present invention has been described with a degree of particularity, it is the intent that the invention include all modifications and alterations falling within the spirit or scope of the appended claims.

What is claimed is:

1. A method of applying aligned tape patterns to first and second sides of a glass sheet, comprising:

a) positioning the glass sheet such that the first side of the glass sheet is accessible to a tape application head and determining a position and orientation of a first corner of the glass sheet;

b) automatically applying a first tape pattern to the first side of the glass sheet with the tape application head by referencing a location and orientation of the first corner of the glass sheet;

c) turning the sheet of glass over such that the second side is accessible to the tape application head and again determining the position and orientation of the first corner; and d) automatically applying a second tape pattern to the second side of the glass sheet with the tape application head by referencing the location and orientation of the first corner, wherein the first tape pattern is aligned with the second tape pattern.

2. The method of claim 1 further wherein the determining of the position and orientation is performed by aligning the first corner of the glass sheet with a first home position fixture when the first side is accessible to the tape application head and aligning the first corner of the glass sheet with a second home position fixture when the second side is accessible to the tape application head to again determine the position and orientation of the first corner.

3. The method of claim 1 further comprising automatically applying a second tape type pattern to the first side of the glass sheet.

4. The method of claim 1 wherein the second tape type pattern is a pattern of tape that provides the appearance of a bevel when applied to a glass surface.

5. The method of claim 1 wherein the determining is performed by optically sensing the position and orientation of the first corner.

6. A method of applying aligned tape patterns to first and second sides of a glass sheet, comprising:

a) placing the sheet of glass on a glass support such that the first side of the glass sheet faces away from the glass support;

b) aligning a first corner of the glass sheet with a first home position fixture to determine a position and orientation of a first corner of the glass sheet;

c) automatically applying a first tape pattern to the first side of the glass sheet with a tape application head by referencing the location and orientation of the first corner;

d) turning sheet of glass over on the glass support such that the second side of the glass sheet faces away from the glass support;

e) aligning the first corner of the glass sheet with a second home position fixture;

f) automatically applying a second tape pattern to the second side of the glass sheet with a tape application head by referencing the location and orientation of the first corner, wherein the first tape pattern is aligned with the second tape pattern.

7. The method of claim 6 further comprising automatically applying a second tape type pattern to the first side of the glass sheet.

8. The method of claim 6 wherein the second tape type pattern is a pattern of tape that provides the appearance of a bevel when applied to a glass surface.

* * * * *